May 29, 1934.   O. R. JOHNSON   1,960,587
SAFETY CRANK FOR MOTORS
Filed March 13, 1933
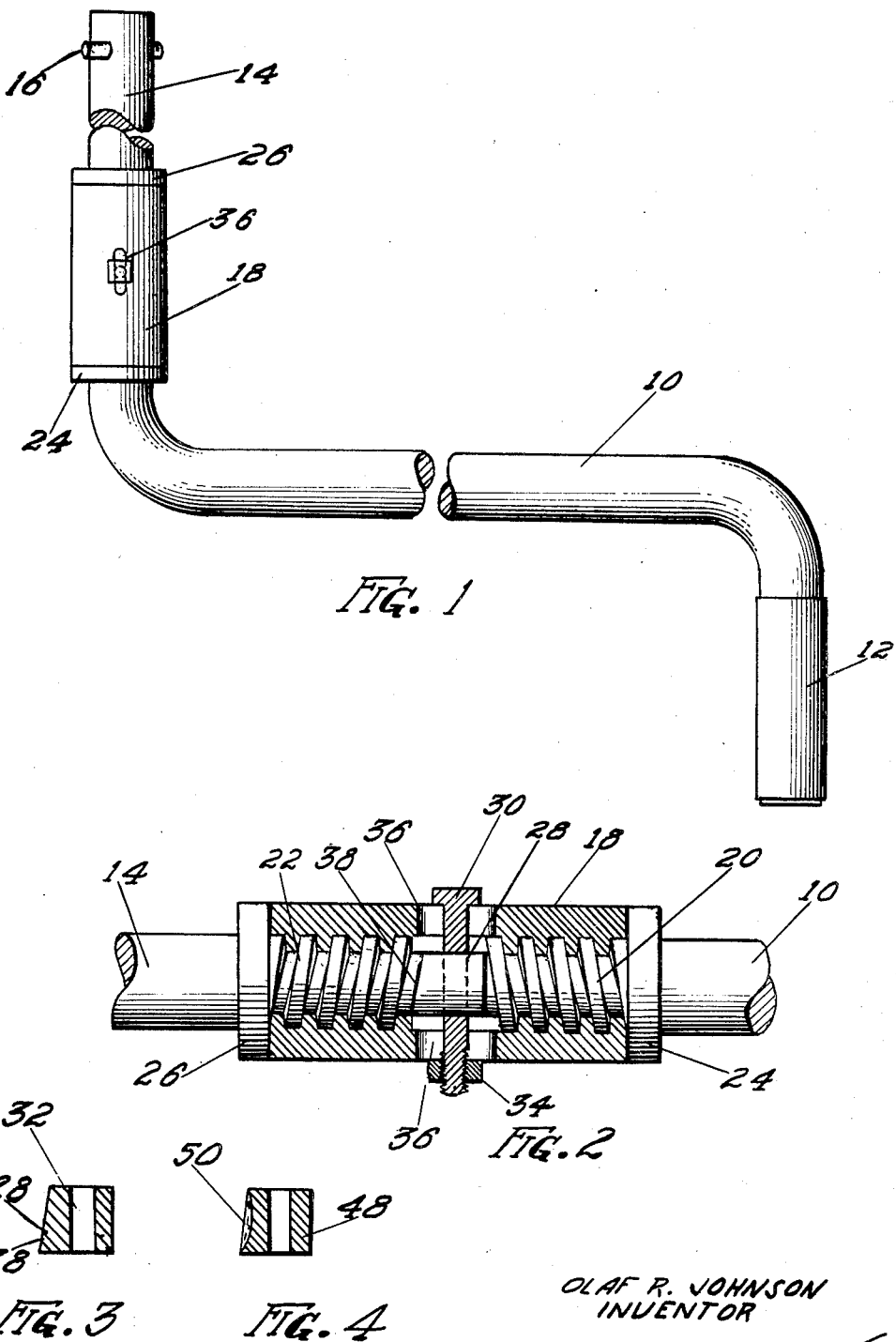
OLAF R. JOHNSON
INVENTOR
PER Albert J. Fike
ATTORNEY Patented May 29, 1934

1,960,587

UNITED STATES PATENT OFFICE 1,960,587

SAFETY CRANK FOR MOTORS

Olaf R. Johnson, Chicago, Ill.

Application March 13, 1933, Serial No. 660,492

9 Claims. (Cl. 123—185)

This invention relates to an improved safety crank for motors, and has for one of its principal objects the provision of a crank for starting internal combustion engines or the like, which shall eliminate the possibilities of damage to the operator due to backfiring or premature explosions of the motor.

One of the important objects of this invention is to provide a safety starting crank for automobile engines and the like which shall be compact, simple of construction, and efficient in operation, and which will provide absolute safety for the user.

Another important object of the invention resides in the provision of a starting crank for internal combustion engines such as those used in automobiles, tractors and similar equipment, whereby, if during the cranking operation, a backfiring of the engine takes place, the handle portion of the crank will be immediately and automatically disengaged from that portion connected to the engine, whereby breakage or other damage of the operator's arm or wrist is avoided.

Other and further important objects of the invention will be apparent from the disclosures in the accompanying drawing and following specification.

The invention, in a preferred form, is illustrated in the drawing and hereinafter more fully described.

In the drawing:

Figure 1 is a plan view of the improved safety crank of this invention, parts being broken away for fore-shortening.

Figure 2 is a detail view, partly in section, showing the interior construction of the automatic safety disengaging feature.

Figure 3 is a sectional view of the improved slidable gripping lug which acts to co-ordinate the screw-threaded ends of the respective handle and shaft portions into an operative unit.

Figure 4 is a sectional view of a similar lug illustrating a slight modification of the invention.

As shown in the drawing:

The reference numeral 10 indicates generally the handle portion of the improved safety crank of this invention, the same having preferably at the end thereof a freely rotatable sleeve 12 whereby easier operation results. That portion of the crank which is directly connected to the motor for starting purposes is indicated at 14, the ordinary cross-bar or similar connecting element being illustrated at 16.

Mounted on the stub shaft 14 and adapted to receive the inner end of the handle portion 10 is a sleeve 18 which is internally screw-threaded at either end as best shown in Figure 2, the screw threads at the handle end being the usual right-hand threads as indicated at 20. The screw threads at the shaft end are left-hand threads as shown at 22.

Suitable collars 24 and 26 respectively are provided on the handle and shaft portions of the crank as illustrated, these being for the purpose of definitely determining the distance into which the screw-threaded ends of the handle and shaft portions will project into the sleeve for effective operation.

Slidably mounted in the sleeve 18 adjacent its middle is a lug or the like 28 which is circular in cross section and maintained in operative position adjacent the middle of the sleeve by means of a bolt or the like 30 passing through an opening 32 therein which bolt is secured in position by an ordinary nut or similar head element 34 which can be screw-threaded or otherwise positioned on the end of the bolt. The ends of this bolt operate in longitudinal slots 36 in the sleeve, and diametrically opposite each other as best shown in Figures 1 and 2. The length of this slot is such as to permit of a sufficient amount of play for the lug itself, whereby practical operation of the device is assured.

As will be evident, one face of the lug 28 is at a right angle to the longitudinal axis of the sleeve 18, this face being adapted to cooperate with a similar right-angled face formed on the inner face of the end of the handle shaft 10. The other face of the lug is angular as indicated at 38 and cooperates with a similar angularly positioned face on the inner end of the shaft 14.

In operation, the crank is assembled with the parts in relative position substantially as shown in Figure 2, and inserted into the socket formed in the crank shaft of the motor for starting purposes. A turning movement on the handle end 12 has a tendency to force the shaft 10 inwardly with respect to the sleeve 18, thereby causing a close contact with the end of this shaft in the corresponding face of the lug 28. On account of the left-hand threads 22 on the end of the shaft 14, a similar close contact is effected between the corresponding angular face of the lug 28 and the inner end of this shaft. So long as normal rotation of the crank continues, the relationship of the parts will remain in this original position, thereby enabling the desired rotation of the motor crank shaft.

In the event, however, that owing to an advanced spark or some other cause, the motor backfires, the immediate accelerated reversal of the stub shaft 14 will cause a backing away of its angular face from the corresponding angular face of the lug 28, this being due to the left-hand threads, and the relationship of the pitch of the threads is such that a single turn of the shaft will effect a complete disengagement between the aforesaid angular face whereby free relative rotation of the parts 14 and 10 is thereafter permitted.

In Figure 4, a slight modification of the invention is illustrated wherein the lug 48, similar to the lug 28, is shown with an inclined face 50 which is also slightly concave whereby more effective operating contact between this and the similarly shaped inner face of the stub shaft 14 results.

It will be seen that herein is provided a safety crank for use in starting internal combustion engines or the like wherein an actual starting operation can be effectively instituted while at the same time all possible danger to the operator or user from backfiring or other undesired reverse rotation of the motor and the crank is positively avoided. Additionally, the device is simple in construction, and therefore, economical of manufacture and cannot get out of order even under the most severe conditions of use or abuse.

I am aware that many changes may be made and numerous details of construction varied throughout a wide range without departing from the principles of this invention, and I, therefore, do not purpose limiting the patent granted hereon otherwise than as necessitated by the prior art.

I claim as my invention:

1. A safety starting crank for internal combustion engines, including a handle and a shaft portion, and a quick detachable connection between said portions, said connection comprising a sleeve, right and left hand threads respectively on the ends of the handle and shaft portions, and corresponding internal threads on the sleeve, and means in the sleeve for connecting the ends of the shafts for positive operation in one direction, and disconnecting the same upon undesired rotation of the shaft in the other direction, said means comprising a lug slidably but non-rotatably mounted in the sleeve.

2. A safety starting crank for internal combustion engines, including a handle and a shaft portion, and a quick detachable connection between said portions, said connection comprising a sleeve, right and left hand threads respectively on the ends of the handle and shaft portions, and corresponding internal threads on the sleeve, and means in the sleeve for connecting the ends of the shafts for positive operation in one direction, and disconnecting the same upon undesired rotation of the shaft in the other direction, said means comprising a lug slidably but non-rotatably mounted in the sleeve, said slidable but non-rotatable mounting comprising a pin passing through the lug, and having its ends positioned in diametrically opposite slots formed in the sleeve.

3. A safety starting crank for internal combustion engines, including a handle and a shaft portion, and a quick detachable connection between said portions, said connection comprising a sleeve, right and left hand threads respectively on the ends of the handle and shaft portions, and corresponding internal threads on the sleeve, and means in the sleeve for connecting the ends of the shafts for positive operation in one direction, and disconnecting the same upon undesired rotation of the shaft in the other direction, said means comprising a lug slidably but non-rotatably mounted in the sleeve, and an angular face on one end of the lug.

4. A safety starting crank for internal combustion engines, including a handle and a shaft portion, and a quick detachable connection between said portions, said connection comprising a sleeve, right and left hand threads respectively on the ends of the handle and shaft portions, and corresponding internal threads on the sleeve, and means in the sleeve for connecting the ends of the shafts for positive operation in one direction, and disconnecting the same upon undesired rotation of the shaft in the other direction, said means comprising a lug slidably but non-rotatably mounted in the sleeve, said lug being circular in cross section and provided with one angular face.

5. A safety starting crank for internal combustion engines, including a handle and a shaft portion, and a quick detachable connection between said portions, said connection comprising a sleeve, right and left hand threads respectively on the ends of the handle and shaft portions, and corresponding internal threads on the sleeve, and means in the sleeve for connecting the ends of the shafts for positive operation in one direction, and disconnecting the same upon undesired rotation of the shaft in the other direction, said means comprising a lug slidably but non-rotatably mounted in the sleeve, said lug being circular in cross section and provided with one angular concave face.

6. A safety crank for automobiles, comprising a handle portion and a shaft portion, a sleeve on the shaft portion, and right and left hand screw-threaded connections between the handle and shaft portions respectively and the sleeve.

7. A safety crank for automobiles, comprising a handle portion and a shaft portion, a sleeve on the shaft portion, and right and left hand screw-threaded connections between the handle and shaft portions respectively and the sleeve, and means in the sleeve for connecting the ends of the handle and shaft for operative rotation in one direction.

8. A safety crank for automobiles, comprising a handle portion and a shaft portion, a sleeve on the shaft portion, and right and left hand screw-threaded connections between the handle and shaft portions respectively and the sleeve, and means in the sleeve for connecting the ends of the handle and shaft for operative rotation in one direction, and a quick release operation upon undesired rotation of the shaft in a reverse direction.

9. A safety crank for automobiles, comprising a handle portion and a shaft portion, a sleeve on the shaft portion, and right and left hand screw-threaded connections between the handle and shaft portions respectively and the sleeve, and means in the sleeve for connecting the ends of the handle and shaft for operative rotation in one direction, and a quick release operation upon undesired rotation of the shaft in a reverse direction, said means comprising a lug slidably but non-rotatably positioned in the sleeve.

OLAF R. JOHNSON.